US 12,425,686 B2

(12) United States Patent
Huang

(10) Patent No.: US 12,425,686 B2
(45) Date of Patent: Sep. 23, 2025

(54) METHOD AND SYSTEM FOR MONITORING PLAYING OF SCREEN DEVICE, AND STORAGE MEDIUM

(71) Applicant: BOE Technology Group Co., Ltd., Beijing (CN)

(72) Inventor: Zhenming Huang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/283,225

(22) PCT Filed: Jan. 6, 2023

(86) PCT No.: PCT/CN2023/070891
§ 371 (c)(1),
(2) Date: Sep. 21, 2023

(87) PCT Pub. No.: WO2023/131269
PCT Pub. Date: Jul. 13, 2023

(65) Prior Publication Data
US 2024/0179372 A1 May 30, 2024

(30) Foreign Application Priority Data
Jan. 10, 2022 (CN) .......................... 202210020664.9

(51) Int. Cl.
*H04N 21/442* (2011.01)
*H04N 21/637* (2011.01)
(52) U.S. Cl.
CPC ..... *H04N 21/44204* (2013.01); *H04N 21/637* (2013.01)
(58) Field of Classification Search
CPC ................. H04N 21/44204; H04N 21/637
See application file for complete search history.

(56) References Cited

U.S. PATENT DOCUMENTS

| 7,089,279 B1 | 8/2006 | Sakaguchi |
| 2017/0053488 A1* | 2/2017 | Takeda ................. G07F 17/3234 |

(Continued)

FOREIGN PATENT DOCUMENTS

| CN | 102510405 A | 6/2012 |
| CN | 102571828 A | 7/2012 |

(Continued)

OTHER PUBLICATIONS

International Search Report for PCT/CN2023/070891 Mailed Apr. 19, 2023.

(Continued)

*Primary Examiner* — Omar S Parra
(74) *Attorney, Agent, or Firm* — Ling Wu; Stephen Yang; Ling and Yang Intellectual Property

(57) ABSTRACT

A method and system for monitoring playing on a screen device, and a storage medium. The method comprises: a web client side acquiring a device identifier of a monitored device, generating a playing monitoring start instruction according to the device identifier of the monitored device, sending the playing monitoring start instruction to a web server side; upon receiving the instruction, the web server side acquiring the device identifier of the monitored device from the instruction, sending the instruction to a screen device side corresponding to the device identifier of the monitored device; the screen device side capturing screen pictures at a preset frequency according to the instruction, to obtain screenshot picture information, sending the screenshot picture information to the web server side; the web server side sending the screenshot picture information to the web client side; the web client side performing displaying according to the screenshot picture information.

19 Claims, 4 Drawing Sheets

(56) References Cited

U.S. PATENT DOCUMENTS

| | | | |
|---|---|---|---|
| 2021/0006864 A1* | 1/2021 | Xu | H04N 21/2187 |
| 2021/0250624 A1* | 8/2021 | Bao | H04N 21/8126 |
| 2023/0164811 A1* | 5/2023 | Yu | H04L 5/003 |
| | | | 370/312 |

FOREIGN PATENT DOCUMENTS

| | | |
|---|---|---|
| CN | 105573577 A | 5/2016 |
| CN | 108616643 A | 10/2018 |
| CN | 110716779 A | 1/2020 |
| CN | 113316000 A | 8/2021 |
| CN | 114363315 A | 4/2022 |

OTHER PUBLICATIONS

Office Action dated Dec. 27, 2023 for Chinese Patent Application No. 202210020664.9 and English Translation.

* cited by examiner

METHOD AND SYSTEM FOR MONITORING PLAYING OF SCREEN DEVICE, AND STORAGE MEDIUM

CROSS-REFERENCE TO RELATED APPLICATIONS

The present application is a U.S. National Phase Entry of International Application No. PCT/CN2023/070891 having an international filing date of Jan. 6, 2023, which claims the priority of the patent application No. 202210020664.9, filed to the CNIPA on Jan. 10, 2022. The above-identified applications are hereby incorporated by reference in their entireties.

TECHNICAL FIELD

Embodiments of the present disclosure relate to, but are not limited to, the monitoring technical field, in particular to a method and system for monitoring playing on a screen device, and a storage medium.

BACKGROUND

A medium management and control system is widely used in transportation, finance, shopping malls, supermarkets and other scenarios. The medium management and control system usually includes a screen device. In actual application scenarios, operation and management personnel need to inspect and monitor, by some means, the playing status on the screen device in the medium management and control system and whether the playing content is legal and compliant.

SUMMARY

The following is a summary of subject matter described herein in detail. The summary is not intended to limit the protection scope of claims.

In a first aspect, an embodiment of the present disclosure provides a method for monitoring playing on a screen device, applied to a system including a web server side, at least one screen device side and at least one web client side corresponding to the web server side, and the method includes the following acts:
  the web client side acquires a device identifier of a monitored device, generates a playing monitoring start instruction according to the device identifier of the monitored device, and sends the playing monitoring start instruction to the web server side;
  the web server side receives the playing monitoring start instruction, acquires the device identifier of the monitored device from the playing monitoring start instruction, and sends the playing monitoring start instruction to the screen device side corresponding to the device identifier of the monitored device;
  the screen device side captures screen pictures at a preset frequency according to the playing monitoring start instruction to obtain screenshot picture information, and sends the screenshot picture information to the web server side;
  the web server side sends the screenshot picture information to the web client side; and
  the web client side performs displaying according to the screenshot picture information.

In an exemplary embodiment, before the web client side acquires the device identifier of the monitored device, the method further includes:
  the screen device side establishes a device connection channel with the web server side, generates a device connection channel identifier, and sends a device identifier of the screen device side to the web server side through the device connection channel;
  the web server side updates a first monitoring table according to the device identifier and the device connection channel identifier, wherein a corresponding relationship between the device identifier and the device connection channel identifier is recorded in the first monitoring table;
  the web client side receives a device monitoring instruction, establishes a client side connection channel with the web server side and generates a client side connection channel identifier, wherein the device monitoring instruction includes the device identifier of the monitored device;
  the act in which the web client side acquires the device identifier of the monitored device, includes: acquiring the device identifier of the monitored device from the device monitoring instruction;
  after the web server side receives the playing monitoring start instruction, the method further includes:
  the web server side acquires the device identifier of the monitored device from the playing monitoring start instruction, and updates a second monitoring table according to the device identifier of the monitored device and the client side connection channel identifier, wherein a corresponding relationship between the device identifier of the monitored device and the client side connection channel identifier is recorded in the second monitoring table; and
  the web server side communicates with the web client side through the client side connection channel, and the web server side communicates with the screen device side through the device connection channel.

In an exemplary embodiment, the act in which the web server side sends the playing monitoring start instruction to the screen device side corresponding to the device identifier of the monitored device, includes: the web server side searches for a device identifier corresponding to the device identifier of the monitored device in the first monitoring table, acquires a device connection channel identifier corresponding to the searched-out device identifier from the first monitoring table, determines a device connection channel according to the device connection channel identifier, and sends the playing monitoring start instruction to the corresponding screen device side through the determined device connection channel; and
  the act in which the web server side sends the screenshot picture information to the web client side, includes: the web server side acquires a device identifier of the monitored device corresponding to the screen device side from the second monitoring table, and sends the screenshot picture information to the web client side through a client side connection channel corresponding to the device identifier of the monitored device.

In an exemplary embodiment, before the screen device side sends the screenshot picture information to the web server side, the method further includes:
  the web server side builds a file storage service;
  the act in which the screen device side sends the screenshot picture information to the web server side, includes:

the screen device side sends the screenshot picture information to the file storage service, receives a picture path returned by the file storage service, and sends the picture path to the web server side through the device connection channel;

the web server side receives the picture path and sends the picture path to the web client side through the client side connection channel;

the act in which the web client side performs displaying according to the screenshot picture information, includes:

the web client side retrieves the screenshot picture information from the file storage service according to the picture path, and performs displaying according to the screenshot picture information.

In an exemplary embodiment, after the web server side receives the picture path, the method further includes: the web server side stores picture path information, wherein the picture path information includes a picture path and time for acquiring the picture path;

after the screen device side sends the picture path to the web server side through the device connection channel, the method further includes:

upon receiving a review playing monitoring instruction, the web client side sends the review playing monitoring instruction to the web server side through the client side connection channel, wherein the review playing monitoring instruction includes a review time point and a device identifier of a monitored device;

the web server side receives the review playing monitoring instruction, acquires a picture path set according to the review playing monitoring instruction, and sends the picture path set to the web client side through the client side connection channel at a preset frequency according to a time sequence of acquiring picture paths, wherein the picture path set includes all picture paths after the review time point corresponding to the device identifier of the monitored device; and the web client side acquires screenshot picture information from the file storage service according to the picture paths in the picture path set, and performs displaying according to the screenshot picture information.

In an exemplary embodiment, after the web server side receives the review playing monitoring instruction, the method further includes:

the web server side acquires a corresponding device connection channel identifier from the first monitoring table according to the device identifier of the monitored device, and determines whether there is still a client side connection channel identifier corresponding to the device identifier of the monitored device in the second monitoring table;

when the web server side determines that there is no client side connection channel identifier corresponding to the device identifier of the monitored device in the second monitoring table, the web server side sends a first playing monitoring stop instruction to a corresponding screen device side through a device connection channel corresponding to the device connection channel identifier; upon receiving the first playing monitoring stop instruction, the screen device side stops capturing screen pictures;

when the web server side determines that there is still a client side connection channel identifier corresponding to the device identifier in the second monitoring table, the web server side sends a first pushing stop instruction to a corresponding screen device side through a device connection channel corresponding to the device connection channel identifier; and upon receiving the first pushing stop instruction, the screen device side stops sending to the web server side a picture path corresponding to the web client side which sends the review playing monitoring instruction.

In an exemplary embodiment, the picture path information further includes a device identifier corresponding to the picture path;

after the web server side receives the review playing monitoring instruction, the method further includes:

upon detecting that there is no picture path corresponding to the device identifier in the picture path set, the web server side sends a playing re-monitoring instruction to the corresponding screen device side through the device connection channel corresponding to the device identifier;

after receiving the playing re-monitoring instruction, the screen device side continues to capture screen pictures at a preset frequency to obtain screenshot picture information, and sends the screenshot picture information to the web server side through the device connection channel; the web server side sends the screenshot picture information to the web client side through the client side connection channel; and the web client side performs displaying according to the screenshot picture information.

In an exemplary embodiment, after the web server side sends the playing monitoring start instruction to the screen device side corresponding to the device identifier of the monitored device, the method further includes:

upon receiving a second playing monitoring stop instruction, the web client side sends the second playing monitoring stop instruction to the web server side through the client side connection channel, and the web server side deletes a client side connection channel identifier corresponding to the web client side which sends the second playing monitoring stop instruction, from the second monitoring table, wherein the second playing monitoring stop instruction includes a device identifier of the monitored device;

the web server side acquires a corresponding device connection channel identifier from the first monitoring table according to the device identifier of the monitored device, and determines whether there is still a client side connection channel identifier corresponding to the device identifier of the monitored device in the second monitoring table;

when the web server side determines that there is no client side connection channel identifier corresponding to the device identifier of the monitored device in the second monitoring table, the web server side sends a second playing monitoring stop instruction to a corresponding screen device side through the device connection channel corresponding to the device identifier of the monitored device, deletes all screenshot picture information corresponding to the device identifier of the monitored device from the file storage service, and deletes the picture path information corresponding to the device identifier of the monitored device; upon receiving the playing monitoring stop instruction, the screen device side stops capturing screen pictures;

when the web server side determines that there is still a client side connection channel identifier corresponding to the device identifier of the monitored device in the second monitoring table, the web server side sends a second pushing stop instruction to a corresponding screen device side through the device connection channel corresponding to the device identifier of the monitored device, and deletes all screenshot picture information corresponding to the device identifier of the monitored device from the file storage service; and upon receiving the second pushing stop instruction, the screen device side stops sending to the web server side a picture path corresponding to the web client side which sends the second playing monitoring stop instruction.

In an exemplary embodiment, after the screen device side sends the screenshot picture information to the web server side, the method further includes:

the web server side stores picture information, wherein the picture information includes screenshot picture information and time for acquiring screenshot pictures;

after the web server side sends the screenshot picture information to the web client side, the method further includes:

upon receiving a review playing monitoring instruction, the web client side sends the review playing monitoring instruction to the web server side through the client side connection channel, wherein the review playing monitoring instruction includes a review time point and a device identifier of the monitored device;

the web server side receives the review playing monitoring instruction, acquires a screenshot picture information set according to the review playing monitoring instruction, and sends the screenshot picture information set to the web client side through the client side connection channel at a preset frequency according to a time sequence of acquiring the screenshot picture information, wherein the screenshot picture information set includes all screenshot picture information after the review time point corresponding to the device identifier of the monitored device; and the web client side performs displaying according to the screenshot picture information.

In an exemplary embodiment, after the web server side receives the review playing monitoring instruction, the method further includes:

the web server side acquires a corresponding device connection channel identifier from the first monitoring table according to the device identifier of the monitored device, and determines whether there is still a client side connection channel identifier corresponding to the device identifier of the monitored device in the second monitoring table;

when the web server side determines that there is no client side connection channel identifier corresponding to the device identifier of the monitored device in the second monitoring table, the web server side sends a first playing monitoring stop instruction to the corresponding screen device side through the device connection channel corresponding to the device identifier of the monitored device; upon receiving the first playing monitoring stop instruction, the screen device side stops capturing screen pictures;

when the web server side determines that there is still a client side connection channel identifier corresponding to the device identifier of the monitored device in the second monitoring table, the web server side sends a first pushing stop instruction to the corresponding screen device side through the device connection channel corresponding to the device identifier of the monitored device; and upon receiving the first pushing stop instruction, the screen device side stops sending to the web client side the screenshot picture information corresponding to the web client side which sends the review playing monitoring instruction.

In an exemplary embodiment, the picture information further includes a device identifier corresponding to the picture path;

after the web server side receives the review playing monitoring instruction, the method further includes:

upon detecting that there is no screenshot picture information corresponding to the device identifier in the screenshot picture information set, the web server side sends a playing re-monitoring instruction to the corresponding screen device side through the device connection channel corresponding to the device identifier;

after receiving the playing re-monitoring instruction, the screen device side continues to capture screen pictures at a preset frequency to obtain screenshot picture information, and sends the screenshot picture information to the web server side through the device connection channel; the web server side sends the screenshot picture information to the web client side through the client side connection channel; and the web client side performs displaying according to the screenshot picture information.

In an exemplary embodiment, after the web server side sends the playing monitoring start instruction to the screen device side corresponding to the device identifier of the monitored device, the method further includes:

upon receiving a second playing monitoring stop instruction, the web client side sends the second playing monitoring stop instruction to the web server side through the client side connection channel, and the web server side deletes the client side connection channel identifier corresponding to the web client side which sends the second playing monitoring stop instruction, from the second monitoring table, wherein the second playing monitoring stop instruction includes a device identifier of the monitored device;

the web server side acquires a corresponding device connection channel identifier from the first monitoring table according to the device identifier of the monitored device, and determines whether there is still a client side connection channel identifier corresponding to the device identifier of the monitored device in the second monitoring table;

when the web server side determines that there is no client side connection channel identifier corresponding to the device identifier of the monitored device in the second monitoring table, the web server side sends a second playing monitoring stop instruction to the corresponding screen device side through the device connection channel corresponding to the device identifier of the monitored device, and deletes all screenshot picture information corresponding to the device identifier of the monitored device from the web server side; upon receiving the playing monitoring stop instruction, the screen device side stops capturing screen pictures;

when the web server side determines that there is still a client side connection channel identifier corresponding to the device identifier of the monitored device in the second monitoring table, the web server side sends a second pushing stop instruction to the corresponding screen device side through the device connection channel corresponding to the device identifier of the monitored device, and deletes all screenshot picture information corresponding to the device identifier of the monitored device; and upon receiving the second pushing stop instruction, the screen device side stops sending to the web server side the screenshot picture corresponding to the web client side which sends the second playing monitoring stop instruction.

In an exemplary embodiment, after the screen device side captures the screen pictures at the preset frequency to obtain the screenshot picture information, the method further includes: the screen device side calls a compression algorithm to compress the screenshot picture information to obtain compressed screenshot picture information;

the act in which the screen device side sends the screenshot picture information to the web server side through the device connection channel, includes: the screen device side sends the compressed screenshot picture information to the web server side through the device connection channel.

In an exemplary embodiment, the preset frequency is 10 to 26 frames per second.

In a second aspect, an embodiment of the present disclosure further provides a system for monitoring playing on a screen device, which is applied to a system including a web server side, at least one screen device side and at least one web client side corresponding to the web server side.

The web client side is configured to acquire a device identifier of a monitored device, generate a playing monitoring start instruction according to the device identifier of the monitored device, and send the playing monitoring start instruction to the web server side; the web client side is further configured to perform displaying according to screenshot picture information.

The web server side is configured to receive the playing monitoring start instruction, acquire the device identifier of the monitored device from the playing monitoring start instruction, and send the playing monitoring start instruction to a screen device side corresponding to the device identifier of the monitored device; the web server side is further configured to send the screenshot picture information to the web client side.

The screen device side is configured to capture screen pictures at a preset frequency according to the playing monitoring start instruction to obtain screenshot picture information, and sends the screenshot picture information to the web server side.

In a third aspect, an embodiment of the present disclosure further provides a non-transitory computer-readable storage medium, configured to store computer program instructions, wherein when the computer program instructions are run, the method for monitoring playing on a screen device according to any one of the above embodiments is implemented.

Other aspects may be understood upon reading and understanding the drawings and detailed description.

BRIEF DESCRIPTION OF DRAWINGS

Accompanying drawings are intended to provide a further understanding of technical solutions of the present disclosure and form a part of the specification, and are used to explain the technical solutions of the present disclosure together with embodiments of the present disclosure, and do not form limitations on the technical solutions of the present disclosure. The shapes and sizes of various components in the drawings do not reflect the true scale, and are only intended to schematically illustrate the contents of the present disclosure.

DETAILED DESCRIPTION

Figure 1:
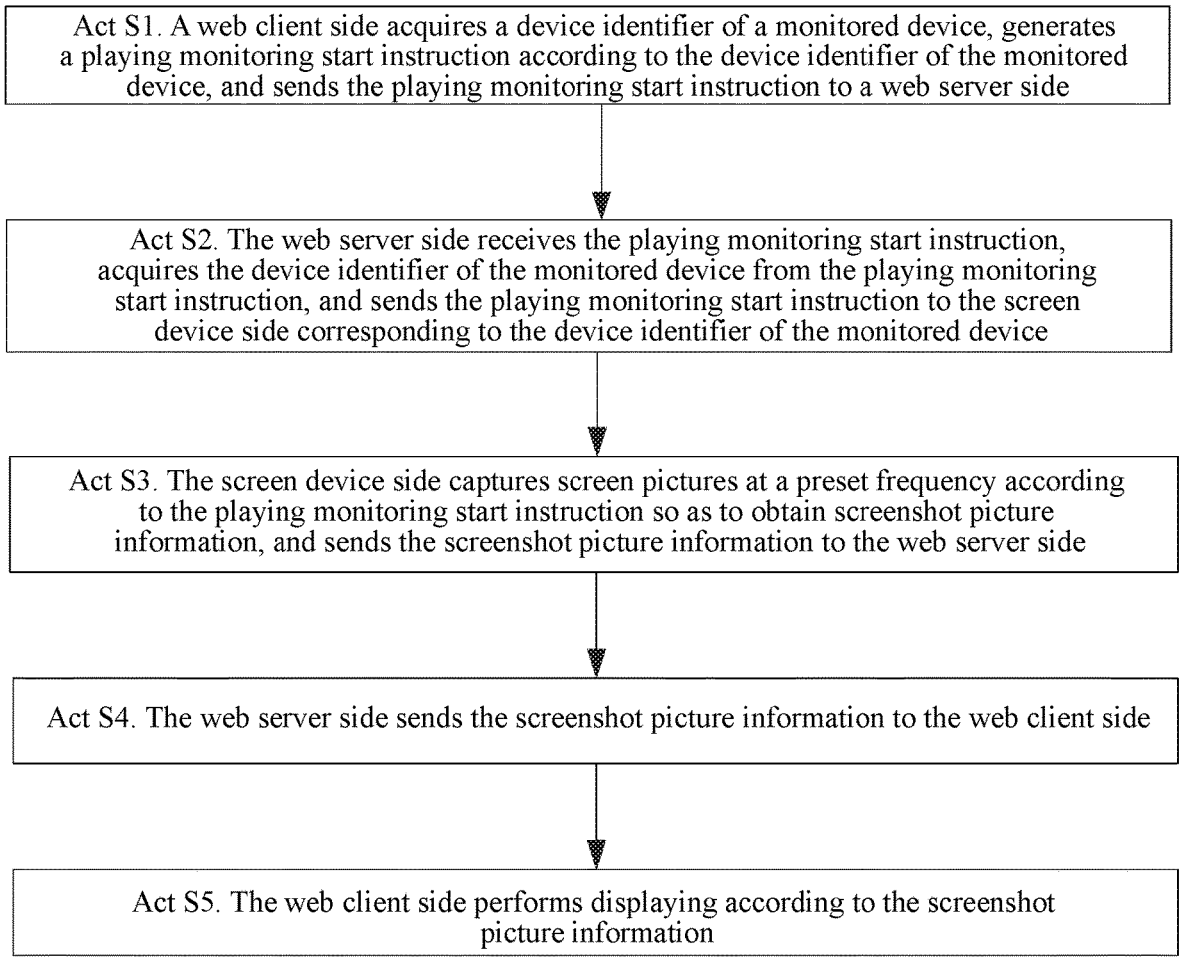
FIG. 1 is a flowchart of a method for monitoring playing on a screen device provided by an embodiment of the present disclosure.

The embodiments of the present disclosure will be described in detail below with reference to the drawings. It is to be noted that implementations may be practiced in a plurality of different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other if there is no conflict.

Unless otherwise defined, technical terms or scientific terms publicly used in the embodiments of the present disclosure should have usual meanings understood by those of ordinary skills in the art to which the present disclosure belongs. "First", "second", and similar terms used in the embodiments of the present disclosure do not represent any order, quantity, or importance, but are only used for distinguishing different components. The word, "include", "contain", or a similar word means that an element or object appearing before the word covers an element or object listed after the word and equivalent thereof, and other elements or objects are not excluded.

At present, building a streaming medium service is usually adopted to solve a problem in playing monitoring. The implementation is as follows: a Web client sends a playing monitoring request to a service server, the service server requests a push stream address from a streaming medium server, and then the service server encapsulates the set parameters such as a frame rate, resolution and a push stream address, into a push stream instruction and sends it to software of a screen device terminal. The software of the screen device terminal calls a push stream service to send collected data (also called push stream) to the streaming medium server through a Real Time Messaging Protocol (RTMP), and the streaming medium server transcodes the data collected by the software of the screen device terminal into a pull streaming address using HTTP-FLV protocol (HTTP is called HyperText Transfer Protocol; and FLV is called FLASH VIDEO, which is a video format; a mode of information transmission using the HTTP-FLV protocol is to encapsulate audio and video data into the FLV format first, and then transmit it to the client through the HTTP protocol) and sends it to the service server. The Web client needs to obtain the pull streaming address from the service server by polling or long connection, and then the Web client calls the streaming medium player to play according to the pull streaming address. There is a certain technical implementation threshold in this mode of playing monitoring, and it needs to deploy a streaming medium server with advanced configuration, which leads to high cost of playing monitoring.

An embodiment of the present disclosure provides a method for monitoring playing on a screen device, which is applied to a system including a web server side, at least one screen device side and at least one web client side corresponding to the web server side.

The method includes: the web client side acquires a device identifier of a monitored device, generates a playing monitoring start instruction according to the device identifier of the monitored device, and sends the playing monitoring start instruction to the web server side; the web server side receives the playing monitoring start instruction, acquires the device identifier of the monitored device from the playing monitoring start instruction, and sends the playing monitoring start instruction to the screen device side corresponding to the device identifier of the monitored device; the screen device side captures screen pictures at a preset frequency according to the playing monitoring start instruction, to obtain screenshot picture information, and sends the screenshot picture information to the web server side; the web server side sends the screenshot picture information to the web client side; and the web client side performs displaying according to the screenshot picture information.

According to the method for monitoring playing on a screen device provided by the embodiment of the present disclosure, the web client side sends a playing monitoring start instruction to the web server side, and then the web server side sends the playing monitoring start instruction to the screen device side; the screen device side captures screen pictures according to the playing monitoring start instruction and sends screenshot picture information, obtained by capturing the screen pictures, to the web server side; the web server side sends the screenshot picture information to the web client side, and the web client side performs displaying according to the screenshot picture information, thereby realizing the monitoring of playing content and playing state of the screen device side. According to the method for monitoring playing on a screen device provided by the embodiment of the present disclosure, the web client side acquires the screenshot picture information of the screen device side through the web server side, so as to realize the monitoring of the screen device side. This method requires a low technical realization threshold, does not need to deploy a streaming medium server with advanced configuration, reduces the cost of monitoring playing on a screen device to a great extent, and overcomes the problem of higher cost in playing monitoring.

As shown in FIG. 1, it is a flowchart of a method for monitoring playing on a screen device provided by an embodiment of the present disclosure. The method for monitoring playing on a screen device includes the following acts S1-S5:

In act S1, a web client side acquires a device identifier of a monitored device, generates a playing monitoring start instruction according to the device identifier of the monitored device, and sends the playing monitoring start instruction to the web server side.

In act S2, the web server side receives the playing monitoring start instruction, acquires the device identifier of the monitored device from the playing monitoring start instruction, and sends the playing monitoring start instruction to the screen device side corresponding to the device identifier of the monitored device.

In act S3, the screen device side captures screen pictures at a preset frequency according to the playing monitoring start instruction to obtain screenshot picture information, and sends the screenshot picture information to the web server side.

In act S4, the web server side sends the screenshot picture information to the web client side.

In act S5, the web client side performs displaying according to the screenshot picture information.

In an embodiment of the present disclosure, in the act S5, the web client side calls a player to display according to the screenshot picture information, thereby realizing the monitoring of the playing content and the playing state of the screen device side.

In an exemplary embodiment, in the act S1 before the web client side acquires the device identifier of the monitored device, the method includes acts S101-S103.

In act S101, the screen device side establishes a device connection channel with the web server side, generates a device connection channel identifier, and sends the device identifier of the screen device side to the web server side through the device connection channel.

In act S102, the web server side updates a first monitoring table according to the device identifier and the device connection channel identifier, wherein a corresponding relationship between the device identifier and the device connection channel identifier is recorded in the first monitoring table. In an embodiment of the present disclosure, a plurality of device identifiers and device connection channel identifiers corresponding to the plurality of device identifiers are recorded in the first monitoring table.

In act S103, the web client side receives a device monitoring instruction, establishes a client side connection channel with the web server side and generates a client side connection channel identifier, wherein the device monitoring instruction includes a device identifier of the monitored device. In an embodiment of the present disclosure, the act in which the web client side receives a device monitoring instruction, includes: the web client side receives trigger information of a monitoring device triggered by a user, and receives the device identifier of the monitored device input by the user.

Correspondingly, in act S1, the act in which the web client side acquires the device identifier of the monitored device, includes: acquiring the device identifier of the monitored device from the device monitoring instruction.

In the act S2, after the web server receives the playing monitoring start instruction, the method further includes: the web server side acquires the device identifier of the monitored device from the playing monitoring start instruction, and updates a second monitoring table according to the device identifier of the monitored device and the client side connection channel identifier, wherein a corresponding relationship between the device identifier of the monitored device and the client side connection channel identifier is recorded in the second monitoring table. In an embodiment of the present disclosure, a plurality of device identifiers and client side connection channel identifiers corresponding to the plurality of device identifiers are recorded in the second monitoring table, wherein each device identifier corresponds to a plurality of client side connection channel identifiers.

In the acts S1 to S4, the web server side communicates with the web client side through the client side connection channel, and the web server side communicates with the screen device side through the device connection channel.

In an exemplary embodiment, in the act S2, the act in which the web server side sends the playing monitoring start instruction to the screen device side corresponding to the device identifier of the monitored device, includes: the web server side searches for a device identifier corresponding to the device identifier of the monitored device in the first monitoring table, acquires a device connection channel identifier corresponding to the searched-out device identifier in the first monitoring table, determines a device connection channel according to the device connection channel identifier, and sends the playing monitoring start instruction to the corresponding screen device side through the determined device connection channel.

In the act S4, the act in which the web server side sends the screenshot picture information to the web client side, includes: the web server side acquires a device identifier of the monitored device corresponding to the screen device side from the second monitoring table, and sends the screenshot picture information to the web client side through the client side connection channel corresponding to the device identifier of the monitored device.

In an embodiment of the present disclosure, a device identifier of each monitored device in the second monitoring table corresponds to a plurality of client side connection channel identifiers, and the web server side sends the screenshot picture information to a plurality of web client sides corresponding to the plurality of client side connection channel identifiers corresponding to the device identifier of the monitored device, thereby realizing that the plurality of web client sides all monitor the playing content and playing state of the same screen device side.

In an exemplary embodiment, the screen device side includes a screen device side hardware and a screen device side software. The act S101 includes: the screen device side software is started automatically as the screen device hardware is turned on, and is continuously run through a daemon process; after being started, the screen device side software establishes a device side connection channel with the web server side, generates a device connection channel identifier, and sends the device identifier of itself to the web server side through the established device connection channel. In an embodiment of the present disclosure, the device identifier is any one or more of the followings acquired by the screen device side: an address of a screen device side, a network card ID, a CPU ID, a motherboard ID, and a mac address, or the device identifier is obtained by calculation of the screen device side software, which is not limited here in the present disclosure.

In an exemplary embodiment, the act S102 includes: the web server side adds the device identifier and the device connection channel identifier to the first monitoring table. For example, the added device identifier is 00-15-5D-86-E2-63, the device connection channel identifier is ChannelID: c2, and the first monitoring table is shown in Table 1.

TABLE 1

| Device identifier | Device connection channel identifier |
| --- | --- |
| 00-15-5D-F9-C6-FD | ChannelID: c1 |
| 00-15-5D-86-E2-63 | Channel ID: c2 |
| . . . | . . . |

In Table 1, the device identifier 00-15-5D-F9-C6-FD and the device connection channel identifier ChannelID: c1 originally exist. The web server side maintains the first monitoring table shown in Table 1 in real time. Every time a new screen device side establishes a connection with the web server side, the web server side will add a device identifier and device connection channel identifier corresponding to the screen device side to the first monitoring table shown in Table 1. In the first monitoring table shown in Table 1, each device connection channel identifier corresponds to one of the device identifiers, that is, the first monitoring table includes a plurality of device identifiers and a plurality of device connection channel identifiers, and the plurality of device identifiers and the plurality of device connection channel identifiers are in a one-to-one correspondence relationship.

In an exemplary embodiment, the act S103 includes: the web client side receives trigger information of a monitoring device triggered by a user, receives the device identifier of the monitored device input by the user, establishes a client side connection channel with the web server side, and generates a client side connection channel identifier. In an embodiment of the present disclosure, the device identifier of the monitored device input by the user is selected or input by the user at the web client side, and the web client side acquires the device identifier of the monitored device through other ways, which is not limited here in the present disclosure.

In an exemplary embodiment, the act in which the web server side updates the second monitoring table according to the device identifier of the monitored device and the client side connection channel identifier, includes: the web server side adds the device identifier of the monitored device and the client side connection channel identifier to the second monitoring table. For example, the device identifier of the monitored device added is 00-15-5D-86-E2-63, and the client side connection channel identifier is ChannelID: c8, as shown in Table 2.

TABLE 2

| Device identifier of monitored device | Client side connection channel identifier |
| --- | --- |
| 00-15-5D-F9-C6-FD | ChannelID: c3 |
|  | ChannelID: c4 |
|  | . . . |
| 00-15-5D-86-E2-63 | Channel ID: c8 |
|  | ChannelID: c9 |
|  | . . . |
| . . . | . . . |

In Table 2, the device identifier 00-15-5D-F9-C6-FD, and the client side connection channel identifiers ChannelID: c3 and ChannelID: c4 corresponding to the device identifier 00-15-5D-F9-C6-FD exist before updating. The web server side maintains the second monitoring table shown in Table 2 in real time. Every time a new web client side establishes a connection with the web server side, the web server side will add a client side connection channel identifier corresponding to the web client side to a position corresponding to the device identifier of the monitored device in the second monitoring table shown in Table 2. In the second monitoring table shown in Table 2, each client side connection channel identifier corresponds to one of the device identifiers of the monitored devices, and a device identifier of each monitored device corresponds to a plurality of web client sides, i.e., the second monitoring table includes a plurality of device identifiers of the monitored devices and a plurality of client side connection channel identifiers, a device identifier of each monitored device corresponds to one or more client side connection channel identifiers, and each client side connection channel identifier corresponds to one of the device identifiers of the monitored devices.

In an embodiment of the present disclosure, it can be seen from the monitoring table shown in Table 2 that each screen device side is monitored by a plurality of web client sides. The device identifiers in Table 1 and the identifiers of the monitored devices in Table 2 correspond to each other. For example, the device identifier 00-15-5D-86-E2-63 in Table 1 and the identifier 00-15-5D-86-E2-63 of the monitored device in Table 2 correspond to the same screen device side.

In an embodiment of the present disclosure, the client side connection channel and the device connection channel are websocket connection channels. The websocket connection channel belongs to long connection, which may realize that the screen device side continuously pushes the screenshot picture information to the web client side through the web server side, so that the web client side may achieve the visual effect of displaying dynamic pictures when performing displaying according to the screenshot picture information.

In an exemplary embodiment, before the screen device side sends the screenshot picture information to the web server side in the act S3, the method further includes: the web server side builds a file storage service. In an embodiment of the present disclosure, the operation of building a file storage service by the web server side is performed in an act before the act S3, such as in act S1 or act S2, or before act S1, or in act S3 and before the screen device side sends screenshot picture information to the web server side in act S3.

The act in which the screen device side sends the screenshot picture information to the web server side in the act S3 includes acts S31-S32.

In act S31, the screen device side sends the screenshot picture information to the file storage service, receives a picture path returned by the file storage service, and sends the picture path to the web server side through the device connection channel.

In act S32, the web server side receives the picture path and sends the picture path to the web client side through the client side connection channel.

The act S5 includes: the web client side retrieves the screenshot picture information from the file storage service according to the picture path, and performs displaying according to the screenshot picture information.

In an exemplary embodiment, the act in which the web server side builds a file storage service, includes: the web server side quickly builds a file storage service based on an open source scheme. For example, the web server side builds a file storage technology based on a Fast Distributed File System (abbreviated as FastDFS) or MinIO technology, wherein FastDFS is an open source lightweight distributed file system, and MinIO is an open source object storage server. The web server side builds the file storage service using other technologies, not limited to FastDFS technology or MinIO technology.

In an embodiment of the present disclosure, after receiving the picture path, the web client side acquires the corresponding screenshot picture information from the file storage service according to the picture path for review. For example, the picture path is http://10.10.239.183:8082/blog/demo/1b48ab32cd206ea75186a2a83394f2f0.jpg.

In an exemplary embodiment, in the act S32, after the web server side receives the picture path, the method for monitoring playing on the screen device further includes: the web server side stores picture path information, wherein the picture path information includes the picture path, and time for acquiring the picture path.

After the screen device side sends the picture path to the web server side through the device connection channel in the act S31, the method for monitoring playing on the screen device further includes the following acts H11 and H12.

In act H11, upon receiving a review playing monitoring instruction, the web client side sends the review playing monitoring instruction to the web server side through the client side connection channel, wherein the review playing monitoring instruction includes a review time point, and a device identifier of the monitored device.

In act H12, the web server side receives the review playing monitoring instruction, acquires a picture path set according to the review playing monitoring instruction, and sends the picture path set to the web client side through the client side connection channel at a preset frequency according to a time sequence of acquiring picture paths, wherein the picture path set includes all picture paths after the review time point corresponding to the device identifier of the monitored device; and the web client side acquires screenshot picture information from the file storage service according to picture paths in the picture path set, and performs displaying according to the screenshot picture information.

For example, when the screen device side plays up to 10:00 a.m. on the current day, the web client side receives a review playing monitoring instruction. If the review time point is 9:00 a.m. on the current day, the screenshot picture information between 9:00 a.m. and 10:00 a.m. on the current day is reviewed.

In an embodiment of the present disclosure, the acts H11-H12 are performed in any one of the acts S3-S5. That is, once the screen device side starts capturing screen pictures at a preset frequency according to the playing monitoring start instruction so as to obtain screenshot picture information in the act S3, a review instruction is received to perform reviewing. In an embodiment of the present disclosure, the acts S3-S5 are circularly-performed operation processes, that is, the screen device side captures screen pictures at a preset frequency all the time, and sends screenshot picture information to the web server side every time the screenshot picture information is obtained by capturing the screen pictures, the web server side sends the screenshot picture information to the web client side every time it receives the screenshot picture information, and the web client side performs displaying according to the screenshot picture information received each time.

In an embodiment of the present disclosure, after the file storage service is built, the screenshot picture information is saved through the file storage service, which reduces the storage burden on the web server side to a great extent. Since the web server side no longer undertakes the work of storing the screenshot picture information, the processing efficiency can be improved in the process of monitoring the contents played by the screen device side, thus improving the playing monitoring efficiency. In addition, since the file storage service corresponds to a plurality of web server sides, but is not limited to a certain web server side, the scope of the web client side in the device for monitoring a screen is expanded to a certain extent. In the application of monitoring the screen device side, the web server side is expanded according to the actual situation, and the expanded web server side also accesses the file storage service, thus increasing the operation flexibility and convenience for monitoring the screen device.

In an exemplary embodiment, after the web server side receives the review playing monitoring instruction in the act H12, the method for monitoring playing on the screen device further includes: the web server side acquires a corresponding device connection channel identifier from the first monitoring table according to the device identifier of the monitored device, and determines whether there is still a client side connection channel identifier corresponding to the device identifier of the monitored device in the second monitoring table; when the web server side determines that there is no client side connection channel identifier corresponding to the device identifier of the monitored device in the second monitoring table, the web server side sends a first playing monitoring stop instruction to the corresponding screen device side through the device connection channel corresponding to the device connection channel identifier; upon receiving the first playing monitoring stop instruction, the screen device side stops capturing screen pictures; when the web server side determines that there is still a client side connection channel identifier corresponding to the device identifier of the monitored device in the second monitoring table, the web server side sends a first pushing stop instruction to the corresponding screen device side through the device connection channel corresponding to the device connection channel identifier; upon receiving the first pushing stop instruction, the screen device side stops sending to the web server side the picture path corresponding to the web client side which sends the review playing monitoring instruction.

In an exemplary embodiment, the picture path information further includes a device identifier corresponding to the picture path. In an embodiment of the present disclosure, the screenshot picture information sent by the screen device side to the file storage service includes a device identifier, and the file storage service carries the device identifier when sending the picture path to the screen device side.

After the web server side receives the review playing monitoring instruction in the act H12, the method for monitoring playing on the screen device further includes acts L11-L12.

In act L11, upon detecting that there is no picture path corresponding to the device identifier in the picture path set, the web server side sends a playing re-monitoring instruction to the corresponding screen device side through the device connection channel corresponding to the device identifier. For example, when the screen device plays up to 10:00 a.m. on the current day, the web client side receives a review playing monitoring instruction. If the review time point is 9:00 a.m. on the current day, the screenshot picture information between 9:00 a.m. and 10:00 a.m. on the current day is reviewed. After reviewing the screenshot picture information at 10:00 a.m. on the current day, there is no picture path corresponding to the device identifier in the picture path set.

In act L12, after receiving the playing re-monitoring instruction, the screen device side continues to capture screen pictures at a preset frequency to obtain screenshot picture information, and sends the screenshot picture information to the web server side through the device connection channel; the web server side sends the screenshot picture information to the web client side through the client side connection channel; and the web client side calls to display according to the screenshot picture information. For example, reviewing is started at 10:00 a.m. on the current day, the review time point is 9:00 a.m. on the current day, and the reviewing time length is one hour. It is 11:00 a.m. on the current day when the review of the screenshot information of 10:00 a.m. on the current day is finished. When the screen device side receives a playing re-monitoring instruction, it may be 11:00 a.m. or a time point after 11:00 a.m. on the current day. The screen device side starts to re-monitor after receiving the playing re-monitoring instruction. That is, the screen device side starts to re-monitor at or after 11:00 a.m. on the current day according to the playing re-monitoring instruction.

In an exemplary embodiment, after the web server side sends the playing monitoring start instruction to the screen device side corresponding to the device identifier of the monitored device in the act S2, the method for monitoring playing on the screen device further includes the following acts T11-T12:

In act T11, upon receiving a second playing monitoring stop instruction, the web client side sends the second playing monitoring stop instruction to the web server side through the client side connection channel, and the web server side deletes from the second monitoring table the client side connection channel identifier corresponding to the web client side which sends the second playing monitoring stop instruction, wherein the second playing monitoring stop instruction includes a device identifier of the monitored device.

In act T12, the web server side acquires a corresponding device connection channel identifier from the first monitoring table according to the device identifier of the monitored device, and determines whether there is still a client side connection channel identifier corresponding to the device identifier of the monitored device in the second monitoring table; when the web server side determines that there is no client side connection channel identifier corresponding to the device identifier of the monitored device in the second monitoring table, the web server side sends a second playing monitoring stop instruction to the corresponding screen device side through the device connection channel corresponding to the device identifier of the monitored device, deletes all screenshot picture information corresponding to the device identifier of the monitored device from the file storage service, and deletes the picture path information corresponding to the device identifier of the monitored device; and upon receiving the playing monitoring stop instruction, the screen device side stops capturing screen pictures; and when the web server side determines that there is a client side connection channel identifier corresponding to the device identifier of the monitored device in the second monitoring table, the web server side sends a second pushing stop instruction to the corresponding screen device side through the device connection channel corresponding to the device identifier of the monitored device, and deletes all screenshot picture information corresponding to the device identifier of the monitored device from the file storage service; and upon receiving the second pushing stop instruction, the screen device side stops sending to the web server side the picture path corresponding to the web client side which sends the second playing monitoring stop instruction.

In an embodiment of the present disclosure, the web server side receives the second pushing stop instruction and deletes all screenshot pictures corresponding to the device identifier from the storage service, thereby saving the storage space of the storage service and avoiding insufficient storage space caused by storing a large number of screenshot pictures in the storage service. Upon receiving the second pushing stop instruction, the web server side deletes the picture path information corresponding to the device identifier of the monitored device stored in itself, which may save the storage space of the web server side and avoid insufficient server space caused by storing a lot of picture path information.

In an embodiment of the present disclosure, the acts T11-T12 are performed in any one of the acts S3-S5. That is, once the screen device side starts capturing screen pictures at a preset frequency according to the playing monitoring start instruction so as to obtain screenshot picture information in the act S3, a second playing monitoring stop instruction is received to perform the playing monitoring stop operation.

In an exemplary embodiment, after the screen device side sends the screenshot picture information to the web server side in the act S3, the method for monitoring playing on the screen device further includes: the web server side stores picture information, wherein the picture information includes screenshot picture information, and time for acquiring screenshot pictures.

After the act S4, the method for monitoring playing on the screen device further includes the following acts H21-H22.

In act H21, upon receiving a review playing monitoring instruction, the web client side sends a review playing monitoring instruction to the web server side through the client side connection channel, wherein the review playing monitoring instruction includes a review time point and a device identifier of the monitored device.

In act H22, the web server side receives the review playing monitoring instruction, acquires a screenshot picture information set according to the review playing monitoring instruction, and sends the screenshot picture information set to the web client side through the client side connection channel at a preset frequency according to a time sequence of acquiring the screenshot picture information, wherein the screenshot picture information set includes all screenshot picture information after the review time point corresponding to the device identifier of the monitored device; and the web client side performs displaying according to the screenshot picture information.

In the embodiment of the present disclosure, the acts H21-H22 are performed in any one of the acts S3-S5. That is, once the screen device side starts capturing screen pictures at a preset frequency according to the playing monitoring start instruction so as to obtain screenshot picture information in the act S3, a review instruction is received to perform reviewing. In an embodiment of the present disclosure, the acts S3-S5 are circularly-performed operation processes, that is, the screen device side captures screen pictures at a preset frequency all the time, and sends screenshot picture information to the web server side every time the screenshot picture information is obtained by capturing the screen pictures, the web server side sends the screenshot picture information to the web client side every time it receives the screenshot picture information, and the web client side performs displaying according to the screenshot picture information received each time.

In an exemplary embodiment, after the web server side receives the review playing monitoring instruction in the act H22, the method for monitoring playing on the screen device further includes: the web server side acquires a corresponding device connection channel identifier from the first monitoring table according to the device identifier of the monitored device, and determines whether there is still a client side connection channel identifier corresponding to the device identifier of the monitored device in the second monitoring table; when the web server side determines that there is no client side connection channel identifier corresponding to the device identifier of the monitored device in the second monitoring table, the web server side sends a first playing monitoring stop instruction to the corresponding screen device side through the device connection channel corresponding to the device identifier of the monitored device; upon receiving the first playing monitoring stop instruction, the screen device side stops capturing screen pictures; and when the web server side determines that there is still a client side connection channel identifier corresponding to the device identifier of the monitored device in the second monitoring table, the web server side sends a first pushing stop instruction to the corresponding screen device side through the device connection channel corresponding to the device identifier of the monitored device; upon receiving the first pushing stop instruction, the screen device side stops sending to the web client side the screenshot picture information corresponding to the web client side which sends the review playing monitoring instruction.

In an exemplary embodiment, the picture information further includes a device identifier corresponding to the picture path.

After the web server side receives the review playing monitoring instruction in the act H22, the method for monitoring playing on the screen device further includes the following acts L21-L22.

In act L21, upon detecting that there is no screenshot picture information corresponding to the device identifier in the screenshot picture information set, the web server side sends a playing re-monitoring instruction to the corresponding screen device side through the device connection channel corresponding to the device identifier.

In act L22, after receiving the playing re-monitoring instruction, the screen device side continues to capture screen pictures at a preset frequency to obtain screenshot picture information, and sends the screenshot picture information to the web server side through the device connection channel; the web server side sends the screenshot picture information to the web client side through the client side connection channel; and the web client side performs displaying according to the screenshot picture information.

In an exemplary embodiment, after the web server side sends the playing monitoring start instruction to the screen device side corresponding to the device identifier of the monitored device in the act S2, the method for monitoring playing on the screen device further includes the following acts T21-T22.

In act T21, upon receiving a second playing monitoring stop instruction, the web client side sends the second playing monitoring stop instruction to the web server side through the client side connection channel, the web server side deletes from the second monitoring table the client side connection channel identifier corresponding to the web client side which sends the second playing monitoring stop instruction, wherein the second playing monitoring stop instruction includes a device identifier of the monitored device.

In act T22, the web server side acquires a corresponding device connection channel identifier from the first monitoring table according to the device identifier of the monitored device, and determines whether there is still a client side connection channel identifier corresponding to the device identifier of the monitored device in the second monitoring table; when the web server side determines that there is no client side connection channel identifier corresponding to the device identifier of the monitored device in the second monitoring table, the web server side sends a second playing monitoring stop instruction to the corresponding screen device side through the device connection channel corresponding to the device identifier of the monitored device, and deletes all screenshot picture information corresponding to the device identifier of the monitored device from the web server side; and upon receiving the second playing monitoring stop instruction, the screen device side stops capturing screen pictures; and when the web server side determines that there is a client side connection channel identifier corresponding to the device identifier of the monitored device in the second monitoring table, the web server side sends a second pushing stop instruction to the corresponding screen device side through the device connection channel corresponding to the device identifier of the monitored device, and deletes all screenshot picture information corresponding to the device identifier of the monitored device; and upon receiving the second pushing stop instruction, the screen device side stops sending to the web server side the screenshot pictures corresponding to the web client side which sends the second playing monitoring stop instruction.

In an embodiment of the present disclosure, the web server side receives the second pushing stop instruction and deletes all screenshot pictures corresponding to the device identifier, thereby saving the storage space of the web server side and avoiding insufficient storage space caused by storing a large number of screenshot pictures at the web server side.

In an embodiment of the present disclosure, the acts T21-T22 are performed in any one of the acts S3-S5. That is, once the screen device side starts capturing screen pictures at a preset frequency according to the playing monitoring start instruction so as to obtain screenshot picture information in the act S3, the second playing monitoring stop instruction is received to stop monitoring.

In an exemplary embodiment, after the screen device side captures the screen pictures at a preset frequency so as to obtain the screenshot pictures, the method further includes: the screen device side calls a compression algorithm to compress the screenshot pictures to obtain compressed screenshot pictures.

The act in which the screen device side sends the screenshot pictures to the web server side through the device connection channel, includes: the screen device side sends the compressed screenshot pictures to the web server side through the device connection channel.

In an embodiment of the present disclosure, the review playing monitoring instruction and the second stop playing instruction received by the web client side are both received through a client side receiving an operation of a user. For example, the web client side receives the review playing monitoring instruction after the user clicks the review button at the web client side or drags the progress bar of a playing screen at the web client side to a time point before the current playing time point (review time point); and when the user clicks the playing monitoring stop button or performs an operation for closing the web client side, the web client side receives the second playing monitoring stop instruction.

In an embodiment of the present disclosure, the screen device side uses a compression algorithm to compress the screenshot pictures, so as to reduce the file size and save network and storage resources.

In an exemplary embodiment, the preset frequency is 10 to 26 frames per second. For example, the preset frequency is 20 frames per second.

Figure 2:
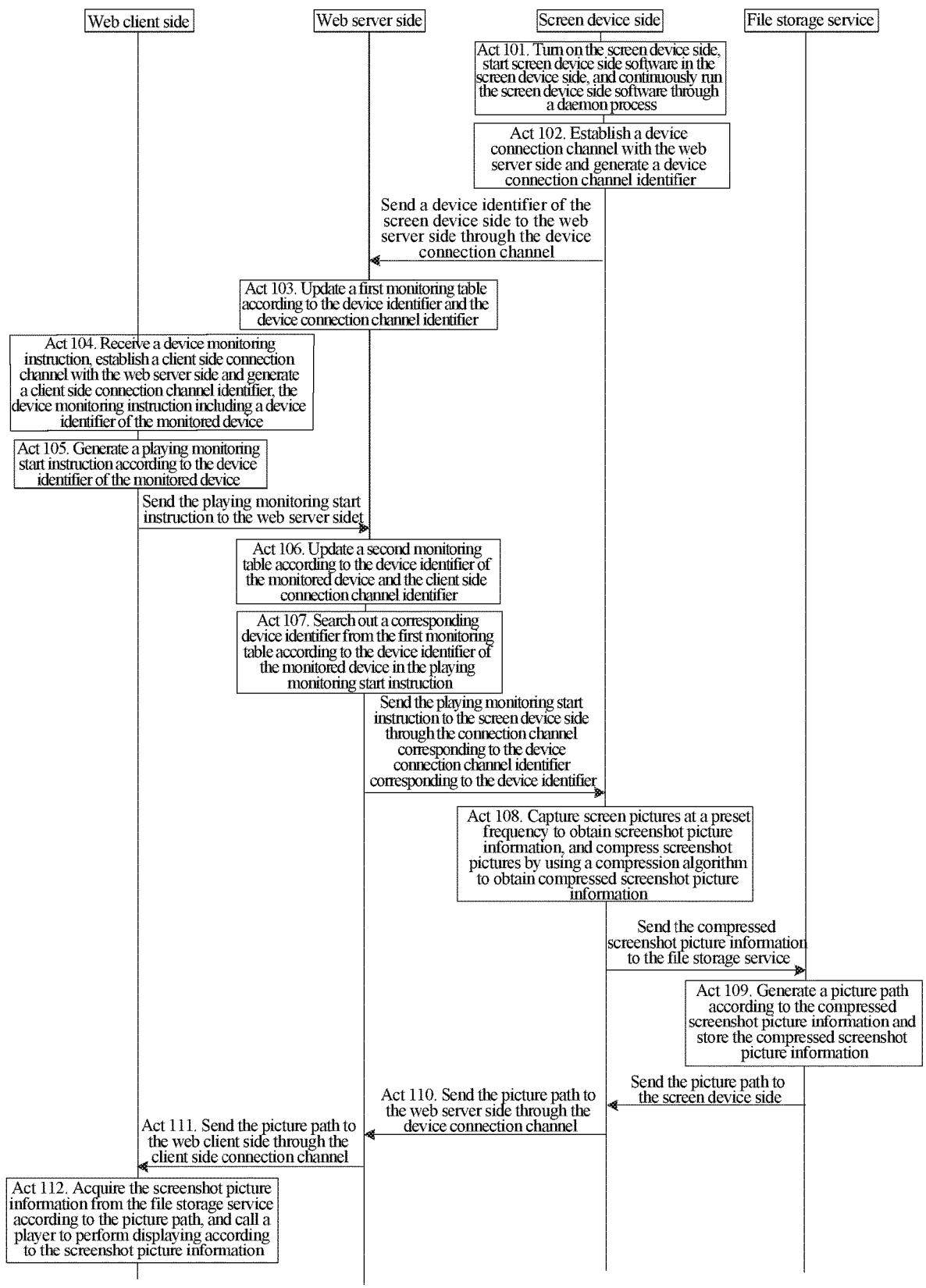
FIG. 2 is a flowchart of a method for monitoring playing on a screen device provided by an exemplary embodiment of the present disclosure.

A method for monitoring playing on a screen device is described in detail below. As shown in FIG. 2, it is a scheme of building a file storage service, the method for monitoring playing on a screen device includes the following acts 101-112.

In act 101, a screen device side is turned on, screen device side software in the screen device side is started, and the screen device side software is continuously run through a daemon process.

In act 102, the screen device side establishes a device connection channel with the web server side, generates a device connection channel identifier, and sends the device identifier of the screen device side to the web server side through the device connection channel.

In act 103, the web server side updates a first monitoring table according to the device identifier and the device connection channel identifier.

In an exemplary embodiment, the act in which the web server side updates the first monitoring table according to the device identifier and the device connection channel identifier, includes: the web server side adds the device identifier and the device connection channel identifier to the first monitoring table. The first monitoring table is shown in Table 1 above and will not be repeated here.

In act 104, the web client side receives a device monitoring instruction, establishes a client side connection channel with the web server side and generates a client side connection channel identifier, wherein the device monitoring instruction includes a device identifier of the monitored device.

In an exemplary embodiment, the act 104 includes: the web client side receives a device monitoring instruction based on a user operation, establishes a client side connection channel with the web server side, and generates a connection channel identifier. In an embodiment of the present disclosure, the device monitoring instruction includes the device identifier of the monitored device, and the device identifier of the monitored device is obtained by receiving user selection or user input at the web client side, or the device identifier is obtained by other ways, which is not limited herein in the present disclosure.

In act 105, the web client side generates a playing monitoring start instruction according to the device identifier of the monitored device, and sends the playing monitoring start instruction to the web server side.

In act 106, the web server side updates a second monitoring table according to the device identifier of the monitored device and the client side connection channel identifier.

In an exemplary embodiment, the act in which the web server side updates the second monitoring table according to the device identifier of the monitored device and the client side connection channel identifier, includes: the web server side adds the device identifier of the monitored device and the client side connection channel identifier to the second monitoring table. Reference may be made to Table 2 above, which is not repeated here.

In act 107, the web server side searches out a corresponding device identifier from the first monitoring table according to the device identifier of the monitored device in the playing monitoring start instruction, and sends the playing monitoring start instruction to the screen device side through the connection channel corresponding to the device connection channel identifier corresponding to the device identifier.

In act 108, the screen device side captures screen pictures at a preset frequency so as to obtain screenshot picture information, compresses the screenshot picture information by using a compression algorithm so as to obtain compressed screenshot pictures, and sends the compressed screenshot picture information to the file storage service.

In act 109, the file storage service generates a picture path according to the compressed screenshot picture information, stores the compressed screenshot picture information, and sends the picture path to the screen device side.

In act 110, the screen device side sends the picture path to the web server side through the device connection channel.

In act 111, the web server side sends the picture path to the web client side through the client side connection channel.

In act 111, the web server side finds a corresponding identifier of the monitored device from the above Table 2 through the device identifier, finds a client side connection channel identifier corresponding to the device identifier of the monitored device, and sends the picture path to the web client side through the client side connection channel corresponding to the found client side connection channel identifier. In an embodiment of the present disclosure, when there are a plurality of client side connection channel identifiers corresponding to the device identifier of the monitored device in Table 2, the web server side sends the picture path to client side connection channels corresponding to the plurality of client side connection channel identifiers corresponding to the device identifier of the monitored device.

In act 112, the web client side acquires the screenshot picture information from the file storage service according to the picture path, and calls a player to perform displaying according to the screenshot picture information.

In an exemplary embodiment, before the act 108, the method for monitoring playing on the screen device further includes: the web server side builds a file storage service.

In an exemplary embodiment, after the screen device side sends the picture path to the web server side through the device connection channel in the act 110, the web server side receives the picture path. After the web server side receives the picture path, the method for monitoring playing on the screen device further includes: the web server side stores picture path information, wherein the picture path information includes a picture path and time for acquiring the picture path.

Accordingly, after the act 109, the method for monitoring playing on the screen device further includes the following acts A1 and A2.

In act A1, upon receiving a review playing monitoring instruction, the web client side sends the review playing monitoring instruction to the web server side through the client side connection channel, wherein the review playing monitoring instruction includes a review time point and a device identifier of the monitored device.

In act A2, the web server side receives the review playing monitoring instruction, acquires a picture path set according to the review playing monitoring instruction, and sends a picture path set to the web client side through the client side connection channel at a preset frequency according to a time sequence of acquiring picture paths, wherein the picture path set includes all picture paths after the review time point corresponding to the device identifier of the monitored device; and the web client side acquires screenshot picture information from the file storage service according to the picture paths in the picture path set, and performs displaying according to the screenshot picture information.

In an embodiment of the present disclosure, after the file storage service is built, the screenshot pictures are saved through the file storage service, which greatly reduces the storage burden of the web server side and improves the playing monitoring efficiency.

In an exemplary embodiment, after the web server side receives the review playing monitoring instruction in the act A2, the method for monitoring playing on the screen device further includes: the web server side acquires a corresponding device connection channel identifier from the first monitoring table according to the device identifier of the monitored device, and determines whether there is still a client side connection channel identifier corresponding to the device identifier of the monitored device in the second monitoring table; when the web server side determines that there is no client side connection channel identifier corresponding to the device identifier of the monitored device in the second monitoring table, the web server side sends a first playing monitoring stop instruction to the corresponding screen device side through the device connection channel corresponding to the device connection channel identifier; upon receiving the first playing monitoring stop instruction, the screen device side stops capturing screen pictures; when the web server side determines that there is still a client side connection channel identifier corresponding to the device identifier of the monitored device in the second monitoring table, the web server side sends a first pushing stop instruction to the corresponding screen device side through the device connection channel corresponding to the device connection channel identifier; upon receiving the first pushing stop instruction, the screen device side stops sending to the web server side the picture path corresponding to the web client side which sends the review playing monitoring instruction.

In an exemplary embodiment, after the act 108, the method for monitoring playing on the screen device further includes the following acts C1 and C2.

In act C1, upon receiving a second playing monitoring stop instruction, the web client side sends the second playing monitoring stop instruction to the web server side through the client side connection channel, and the web server side deletes from the second monitoring table the client side connection channel identifier corresponding to the web client side which sends the second playing monitoring stop instruction, wherein the second playing monitoring stop instruction includes a device identifier of the monitored device.

In act C2, the web server side acquires a corresponding device connection channel identifier from the first monitoring table according to the device identifier of the monitored device, and determines whether there is a client side connection channel identifier corresponding to the device identifier of the monitored device in the second monitoring table; when the web server side determines that there is no client side connection channel identifier corresponding to the device identifier of the monitored device in the second monitoring table, the web server side sends a second playing monitoring stop instruction to the corresponding screen device side through the device connection channel corresponding to the device identifier of the monitored device, deletes all screenshot picture information corresponding to the device identifier of the monitored device from the file storage service, and deletes the picture path information corresponding to the device identifier of the monitored device; upon receiving the playing monitoring stop instruction, the screen device side stops capturing screen pictures; when the web server side determines that there is a client side connection channel identifier corresponding to the device identifier of the monitored device in the second monitoring table, the web server side sends a second pushing stop instruction to the corresponding screen device side through the device connection channel corresponding to the device identifier of the monitored device, and deletes all screenshot picture information corresponding to the device identifier of the monitored device from the file storage service; and upon receiving the second pushing stop instruction, the screen device side stops sending to the web server side the picture path corresponding to the web client side which sends the second playing monitoring stop instruction.

In an embodiment of the present disclosure, the acts 108-112 are executed cyclically until the execution is stopped when the first playing monitoring stop instruction or the second playing monitoring stop instruction is received.

Figure 3:
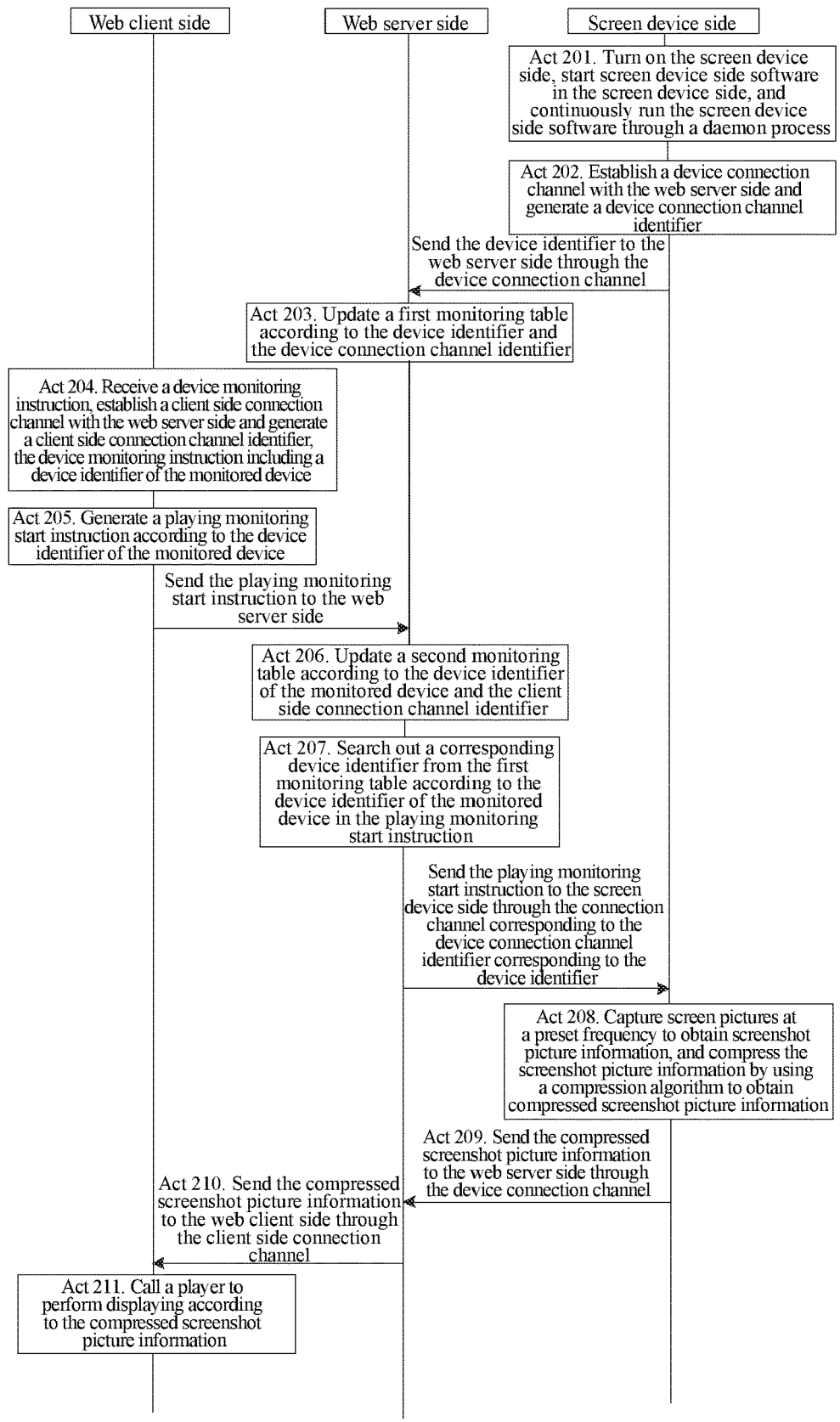
FIG. 3 is a flowchart of another method for monitoring playing on a screen device provided by an exemplary embodiment of the present disclosure.

Another method for monitoring playing on a screen device is described in detail below. As shown in FIG. 3, it is a scheme of not building a file storage service, the method for monitoring playing on a screen device includes the following acts 201-211.

In act 201, a screen device side is turned on, screen device side software in the screen device side is started, and the screen device side software is continuously run through a daemon process.

In act 202, the screen device side establishes a device connection channel with the web server side, generates a device connection channel identifier, and sends the device identifier to the web server side through the device connection channel.

In act 203, the web server side updates a first monitoring table according to the device identifier and the device connection channel identifier.

In an exemplary embodiment, the act in which the web server side updates the first monitoring table according to the device identifier and the device connection channel identifier, includes: the web server side adds the device identifier and the device connection channel identifier to the first monitoring table. The first monitoring table is shown in Table 1 above and will not be repeated here.

In act 204, the web client side receives a device monitoring instruction, establishes a client side connection channel with the web server side and generates a client side connection channel identifier, wherein the device monitoring instruction includes a device identifier of the monitored device.

In an exemplary embodiment, the act in which the web client side receives the device monitoring instruction, establishes the client side connection channel with the web server side and generates the client side connection channel identifier, includes: the web client side receives a device monitoring instruction obtained based on a user operation, establishes a client side connection channel with the web server side and generates a connection channel identifier. In an embodiment of the present disclosure, the device monitoring instruction includes the device identifier of the monitored device, and the device identifier of the monitored device is obtained by receiving user selection or user input at the web client side, or the device identifier is obtained by other ways, which is not limited herein in the present disclosure.

In act 205, the web client side generates a playing monitoring start instruction according to the device identifier, and sends the playing monitoring start instruction to the web server side.

In act 206, the web server side updates a second monitoring table according to the device identifier of the monitored device and the client side connection channel identifier.

In an exemplary embodiment, the act in which the web server side updates the second monitoring table according to the device identifier of the monitored device and the client side connection channel identifier, includes: the web server side adds the device identifier of the monitored device and the client side connection channel identifier to the second monitoring table. Reference may be made to Table 2 above, which is not repeated here. In an embodiment of the present disclosure, when the device identifier of the monitored device is already included in the second monitoring table shown in Table 2, a new client side connection channel identifier is added in a column at which the client side connection channel identifier corresponding to the device identifier of the monitored device.

In act 207, the web server side searches out a corresponding device identifier from the first monitoring table according to the device identifier of the monitored device in the playing monitoring start instruction, and sends the playing monitoring start instruction to the screen device side through the connection channel corresponding to the device connection channel identifier corresponding to the device identifier.

In act 208, the screen device side captures screen pictures at a preset frequency so as to obtain screenshot picture information, and compresses the screenshot picture information by using a compression algorithm to obtain compressed screenshot picture information.

In act 209, the screen device side sends the compressed screenshot pictures to the web server side through the device connection channel.

In act 210, the web server side sends the compressed screenshot picture information to the web client side through the client side connection channel.

In act 211, the web client side calls a player to perform displaying according to the compressed screenshot picture information.

In an exemplary embodiment, after the web server side acquires the screenshot picture information, the method further includes: the web server side stores the picture information, wherein the picture information includes a screenshot picture and time for acquiring the screenshot picture.

After the act 210, the method for monitoring playing on the screen device further includes the following acts A11-A12.

In act A11, upon receiving a review playing monitoring instruction, the web client side sends the review playing monitoring instruction to the web server side through the client side connection channel, wherein the review playing monitoring instruction includes a review time point and a device identifier of the monitored device.

In act A12, the web server side receives the review playing monitoring instruction, acquires a screenshot picture information set according to the review playing monitoring instruction, and sends the screenshot picture information set to the web client side through the client side connection channel at a preset frequency according to a time sequence of acquiring the screenshot picture information, wherein the screenshot picture information set includes all screenshot picture information after the review time point corresponding to the device identifier of the monitored device; and the web client side calls a player to perform displaying according to the screenshot pictures.

In an exemplary embodiment, after the web server side receives the review playing monitoring instruction in the act A12, the method for monitoring playing on the screen device further includes: the web server side acquires a corresponding device connection channel identifier from the first monitoring table according to the device identifier of the monitored device, and determines whether there is still a client side connection channel identifier corresponding to the device identifier of the monitored device in the second monitoring table; when the web server side determines that there is no client side connection channel identifier corresponding to the device identifier of the monitored device in the second monitoring table, the web server side sends a first playing monitoring stop instruction to the corresponding screen device side through the device connection channel corresponding to the device identifier of the monitored device; upon receiving the first playing monitoring stop instruction, the screen device side stops capturing screen pictures; and when the web server side determines that there is still a client side connection channel identifier corresponding to the device identifier of the monitored device in the second monitoring table, the web server side sends a first pushing stop instruction to the corresponding screen device side through the device connection channel corresponding to the device identifier of the monitored device; upon receiving the first pushing stop instruction, the screen device side stops sending to the web client side the screenshot picture information corresponding to the web client side which sends the review playing monitoring instruction.

In an exemplary embodiment, after the act 209, the method for monitoring playing on the screen device further includes the following acts B11-B12.

In act B11, upon receiving a second playing monitoring stop instruction, the web client side sends the second playing monitoring stop instruction to the web server side through the client side connection channel, and the web server side deletes from the second monitoring table the client side connection channel identifier corresponding to the web client side which sends the second playing monitoring stop instruction, wherein the second playing monitoring stop instruction includes a device identifier of the monitored device.

In act B12, the web server side acquires a corresponding device connection channel identifier from the first monitoring table according to the device identifier of the monitored device, and determines whether there is a client side connection channel identifier corresponding to the device identifier of the monitored device in the second monitoring table; when the web server side determines that there is no client side connection channel identifier corresponding to the device identifier of the monitored device in the second monitoring table, the web server side sends a second playing monitoring stop instruction to the corresponding screen device side through the device connection channel corresponding to the device identifier of the monitored device, and deletes all screenshot picture information corresponding to the device identifier of the monitored device from the web server side; upon receiving the second playing monitoring stop instruction, the screen device side stops capturing screen pictures; when the web server side determines that there is a client side connection channel identifier corresponding to the device identifier of the monitored device in the second monitoring table, the web server side sends a second pushing stop instruction to the corresponding screen device side through the device connection channel corresponding to the device identifier of the monitored device, and deletes all screenshot picture information corresponding to the device identifier of the monitored device; and upon receiving the second pushing stop instruction, the screen device side stops sending to the web server side the screenshot pictures corresponding to the web client side which sends the second playing monitoring stop instruction.

In an embodiment of the present disclosure, the acts 208-211 are executed cyclically until the execution is stopped when the first playing monitoring stop instruction or the second playing monitoring stop instruction is received.

Figure 4:
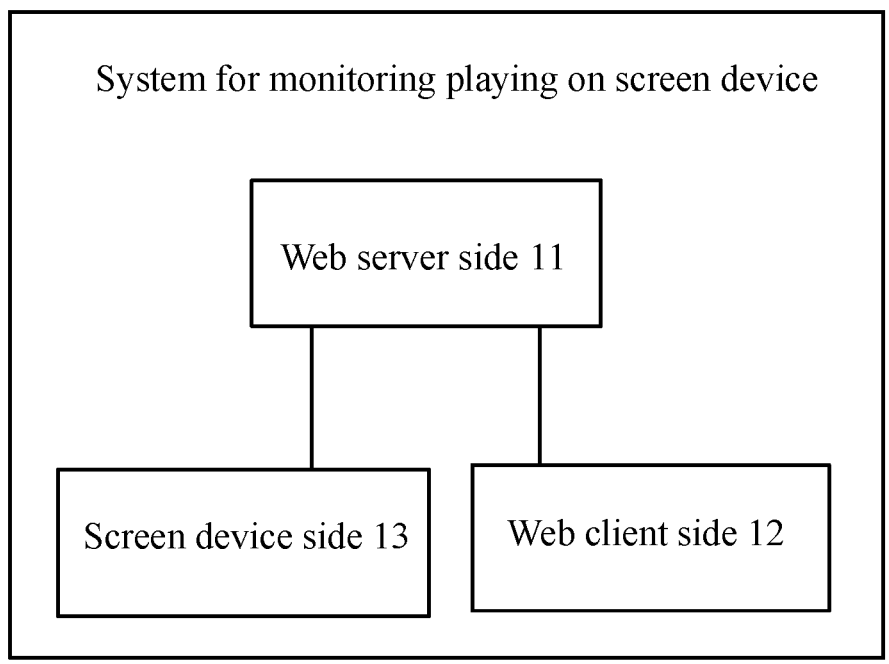
FIG. 4 is a schematic structural diagram of a system for monitoring playing on a screen device provided by an embodiment of the present disclosure.

An embodiment of the present disclosure further provides a system for monitoring playing on a screen device, as shown in FIG. 4, which is applied to a system including a web server 11, at least one screen device side 13 and at least one web client side 12 corresponding to the web server side.

The web client side 12 is configured to acquire a device identifier of a monitored device, generate a playing monitoring start instruction according to the device identifier of the monitored device, and send the playing monitoring start instruction to the web server side 11; the web client side is further configured to perform displaying according to screenshot picture information.

The web server side 11 is configured to acquire the device identifier of the monitored device from the playing monitoring start instruction upon receiving the playing monitoring start instruction, and send the playing monitoring start instruction to a screen device side 13 corresponding to the device identifier of the monitored device; the web server side is further configured to send the screenshot picture information to the web client side 12.

The screen device side 13 is configured to capture screen pictures at a preset frequency according to the playing monitoring start instruction so as to obtain screenshot picture information, and send the screenshot picture information to the web server side 11.

An embodiment of the present disclosure further provides a non-transitory computer-readable storage medium, configured to store computer program instructions, wherein when the computer program instructions are run, the method for monitoring playing on a screen device according to any one of the above embodiments is implemented.

According to the method and system for monitoring playing on a screen device and the storage medium provided by the embodiments of the present disclosure, a web client side sends a playing monitoring start instruction to a web server side, and then the web server side sends the playing monitoring start instruction to a screen device side; the screen device side captures screen pictures according to the playing monitoring start instruction and sends screenshot picture information obtained by capturing the screen pictures to the web server side; the web server side sends the screenshot picture information to the web client side, and the web client side performs displaying according to the screenshot picture information, thereby realizing the monitoring of the playing content and playing state of the screen device side. According to the method for monitoring playing on a screen device provided by the embodiment of the present disclosure, the web client side acquires the screenshot picture information of the screen device side through the web server side, so as to realize the monitoring of the screen device side. This method requires a low technical realization threshold, does not need to deploy a streaming medium server with advanced configuration, reduces the cost of monitoring the playing on a screen device to a great extent, and overcomes the problem of higher cost in monitoring playing.

It may be understood by those of ordinary skills in the art that all or some acts in a method and function modules/units in a system and apparatus disclosed above may be implemented as software, firmware, hardware, and appropriate combinations thereof. In a hardware implementation, division of the function modules/units mentioned in the above description does not necessarily correspond to division of physical components. For example, a physical component may have multiple functions, or a function or an act may be executed by several physical components in cooperation. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skills in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skills in the art that the communication medium usually includes a computer-readable instruction, a data structure, a program module, or other data in a modulated data signal of, such as, a carrier or another transmission mechanism, and may include any information delivery medium.

The drawings of the embodiments of the present disclosure only involve structures involved in the embodiments of the present disclosure, and other structures may refer to usual designs.

The embodiments of the present disclosure, i.e., features in the embodiments, may be combined with each other to obtain new embodiments if there is no conflict.

Although the implementations disclosed in the present disclosure are as above, the described contents are only implementations used for convenience of understanding the present disclosure and are not intended to limit the present disclosure. Any person skilled in the art to which the present disclosure pertains can make any modifications and variations in the forms and details of the implementations without departing from the spirit and the scope disclosed in the present disclosure, but the patent protection scope of the present disclosure shall still be subject to the scope defined by the appended claims.

The invention claimed is:

1. A method for monitoring playing on a screen device, applied to a system comprising a web server side, at least one screen device side, and at least one web client side corresponding to the web server side, the method comprising:
    acquiring, by the web client side, a device identifier of a monitored device, generating a playing monitoring start instruction according to the device identifier of the monitored device, and sending the playing monitoring start instruction to the web server side;
    receiving, by the web server side, the playing monitoring start instruction, acquiring the device identifier of the monitored device from the playing monitoring start instruction, and sending the playing monitoring start instruction to a screen device side corresponding to the device identifier of the monitored device;
    capturing, by the screen device side, screen pictures at a preset frequency according to the playing monitoring start instruction, to obtain screenshot picture information, and sending the screenshot picture information to the web server side;
    sending, by the web server side, the screenshot picture information to the web client side; and
    performing, by the web client side, displaying according to the screenshot picture information,
    wherein before the web client side acquires the device identifier of the monitored device, the method further comprises:
    establishing, by the screen device side, a device connection channel with the web server side, generating a device connection channel identifier, and sending a device identifier of the screen device side to the web server side through the device connection channel;
    updating, by the web server side, a first monitoring table according to the device identifier and the device connection channel identifier, wherein a corresponding relationship between the device identifier and the device connection channel identifier is recorded in the first monitoring table;
    receiving, by the web client side, a device monitoring instruction, establishing a client side connection channel with the web server side and generating a client side connection channel identifier, wherein the device monitoring instruction comprises the device identifier of the monitored device; and
    acquiring, by the web client side, the device identifier of the monitored device, comprises: acquiring the device identifier of the monitored device from the device monitoring instruction;
    wherein after the web server side receives the playing monitoring start instruction, the method further comprises:
    acquiring, by the web server side, the device identifier of the monitored device from the playing monitoring start instruction, and updating a second monitoring table according to the device identifier of the monitored device and the client side connection channel identifier, wherein a corresponding relationship between the device identifier of the monitored device and the client side connection channel identifier is recorded in the second monitoring table; and
    communicating, by the web server side, with the web client side through the client side connection channel, and communicating, by the web server side, with the screen device side through the device connection channel.

2. The method according to claim 1, wherein sending, by the web server side, the playing monitoring start instruction to the screen device side corresponding to the device identifier of the monitored device, comprises: searching, by the web server side, for a device identifier corresponding to the device identifier of the monitored device in the first monitoring table, acquiring a device connection channel identifier corresponding to the searched-out device identifier from the first monitoring table, determining a device connection channel according to the device connection channel identifier, and sending the playing monitoring start instruction to the corresponding screen device side through the determined device connection channel; and
    sending, by the web server side, the screenshot picture information to the web client side, comprises: acquiring, by the web server side, a device identifier of the monitored device corresponding to the screen device side from the second monitoring table, and sending the screenshot picture information to the web client side through a client side connection channel corresponding to the device identifier of the monitored device.

3. The method according to claim 1, wherein before the screen device side sends the screenshot picture information to the web server side, the method further comprises:
    building, by the web server side, a file storage service;
    sending, by the screen device side, the screenshot picture information to the web server side, comprises:
    sending, by the screen device side, the screenshot picture information to the file storage service, receiving a picture path returned by the file storage service, and sending the picture path to the web server side through the device connection channel;

receiving, by the web server side, the picture path, and sending the picture path to the web client side through the client side connection channel;

performing, by the web client side, displaying according to the screenshot picture information, comprises:

retrieving, by the web client side, the screenshot picture information from the file storage service according to the picture path, and performing displaying according to the screenshot picture information.

4. The method according to claim 3, wherein after the web server side receives the picture path, the method further comprises: storing, by the web server side, picture path information, wherein the picture path information comprises a picture path, and time for acquiring the picture path;

after the screen device side sends the picture path to the web server side through the device connection channel, the method further comprises:

upon the web client side receives a review playing monitoring instruction, sending, by the web client side, the review playing monitoring instruction to the web server side through the client side connection channel, wherein the review playing monitoring instruction comprises a review time point, and a device identifier of a monitored device;

receiving, by the web server side, the review playing monitoring instruction, acquiring a picture path set according to the review playing monitoring instruction, and sending the picture path set to the web client side through the client side connection channel at a preset frequency according to a time sequence of acquiring picture paths, wherein the picture path set comprises all picture paths after the review time point corresponding to the device identifier of the monitored device; and acquiring, by the web client side, screenshot picture information from the file storage service according to the picture paths in the picture path set, and performing displaying according to the screenshot picture information.

5. The method according to claim 4, wherein after the web server side receives the review playing monitoring instruction, the method further comprises:

acquiring, by the web server side, a corresponding device connection channel identifier from the first monitoring table according to the device identifier of the monitored device, and determining whether there is still a client side connection channel identifier corresponding to the device identifier of the monitored device in the second monitoring table;

when the web server side determines that there is no client side connection channel identifier corresponding to the device identifier of the monitored device in the second monitoring table, sending, by the web server side, a first playing monitoring stop instruction to a corresponding screen device side through a device connection channel corresponding to the device connection channel identifier; and upon the screen device side receives the first playing monitoring stop instruction, stopping, by the screen device side, capturing screen pictures; and when the web server side determines that there is still a client side connection channel identifier corresponding to the device identifier in the second monitoring table, sending, by the web server side, a first pushing stop instruction to a corresponding screen device side through a device connection channel corresponding to the device connection channel identifier; and upon the screen device side receives the first pushing stop instruction, stopping, by the screen device side, sending to the web server side a picture path corresponding to the web client side which sends the review playing monitoring instruction.

6. The method according to claim 5, wherein the picture path information further comprises a device identifier corresponding to the picture path;

after the web server side receives the review playing monitoring instruction, the method further comprises:

upon the web server side detects that there is no picture path corresponding to the device identifier in the picture path set, sending, by the web server side, a playing re-monitoring instruction to the corresponding screen device side through the device connection channel corresponding to the device identifier;

after the screen device side receives the playing re-monitoring instruction, continuing to capture, by the screen device side, screen pictures at a preset frequency to obtain screenshot picture information, and sending the screenshot picture information to the web server side through the device connection channel; sending, by the web server side, the screenshot picture information to the web client side through the client side connection channel; and performing, by the web client side, displaying according to the screenshot picture information.

7. The method according to claim 4, wherein after the web server side sends the playing monitoring start instruction to the screen device side corresponding to the device identifier of the monitored device, the method further comprises:

upon the web client side receives a second playing monitoring stop instruction, sending, by the web client side, the second playing monitoring stop instruction to the web server side through the client side connection channel, and deleting, by the web server side, a client side connection channel identifier corresponding to the web client side which sends the second playing monitoring stop instruction, from the second monitoring table, wherein the second playing monitoring stop instruction comprises a device identifier of the monitored device;

acquiring, by the web server side, a corresponding device connection channel identifier from the first monitoring table according to the device identifier of the monitored device, and determining whether there is still a client side connection channel identifier corresponding to the device identifier of the monitored device in the second monitoring table;

when the web server side determines that there is no client side connection channel identifier corresponding to the device identifier of the monitored device in the second monitoring table, sending, by the web server side, a second playing monitoring stop instruction to a corresponding screen device side through the device connection channel corresponding to the device identifier of the monitored device, deleting all screenshot picture information corresponding to the device identifier of the monitored device from the file storage service, and deleting picture path information corresponding to the device identifier of the monitored device; and upon the screen device side receives the playing monitoring stop instruction, stopping, by the screen device side, capturing screen pictures; and when the web server side determines that there is still a client side connection channel identifier corresponding to the device identifier of the monitored device in the second monitoring table, sending, by the web server side, a second pushing stop instruction to a corresponding screen device side through the device connection channel corresponding to the device identifier of the monitored device, and deleting all screenshot picture information corresponding to the device identifier of the monitored device from the file storage service; and upon the screen device side receives the second pushing stop instruction, stopping, by the screen device side, sending to the web server side a picture path corresponding to the web client side which sends the second playing monitoring stop instruction.

8. The method according to claim 3, wherein after the screen device side captures the screen pictures at the preset frequency to obtain the screenshot picture information, the method further includes: the screen device side calls a compression algorithm to compress the screenshot picture information to obtain compressed screenshot picture information;
   sending, by the screen device side, the screenshot picture information to the file storage service includes: sending, by the screen device side, the compressed screenshot picture information to the file storage service.

9. The method according to claim 3, wherein the web server side builds the file storage service based on a Fast Distributed File System (FastDFS) or MinIO technology.

10. The method according to claim 1, wherein after the screen device side sends the screenshot picture information to the web server side, the method further comprises:
   storing, by the web server side, picture information, wherein the picture information comprises screenshot picture information, and time for acquiring screenshot pictures;
   after the web server side sends the screenshot picture information to the web client side, the method further comprises:
   upon the web client side receives a review playing monitoring instruction, sending, by the web client side, the review playing monitoring instruction to the web server side through the client side connection channel, wherein the review playing monitoring instruction comprises a review time point, and a device identifier of the monitored device;
   receiving, by the web server side, the review playing monitoring instruction, acquiring a screenshot picture information set according to the review playing monitoring instruction, and sending the screenshot picture information set to the web client side through the client side connection channel at a preset frequency according to a time sequence of acquiring the screenshot picture information, wherein the screenshot picture information set comprises all screenshot picture information after the review time point corresponding to the device identifier of the monitored device; and
   performing, by the web client side, displaying according to the screenshot picture information.

11. The method according to claim 10, wherein after the web server side receives the review playing monitoring instruction, the method further comprises:
   acquiring, by the web server side, a corresponding device connection channel identifier from the first monitoring table according to the device identifier of the monitored device, and determining whether there is still a client side connection channel identifier corresponding to the device identifier of the monitored device in the second monitoring table;
   when the web server side determines that there is no client side connection channel identifier corresponding to the device identifier of the monitored device in the second monitoring table, sending, by the web server side, a first playing monitoring stop instruction to the corresponding screen device side through the device connection channel corresponding to the device identifier of the monitored device; and upon the screen device side receives the first playing monitoring stop instruction, stopping, by the screen device side, capturing screen pictures; and
   when the web server side determines that there is still a client side connection channel identifier corresponding to the device identifier of the monitored device in the second monitoring table, sending, by the web server side, a first pushing stop instruction to the corresponding screen device side through the device connection channel corresponding to the device identifier of the monitored device; and upon the screen device side receives the first pushing stop instruction, stopping, by the screen device side, sending to the web client side the screenshot picture information corresponding to the web client side which sends the review playing monitoring instruction.

12. The method according to claim 11, wherein the picture information further comprises a device identifier corresponding to the picture path;
   after the web server side receives the review playing monitoring instruction, the method further comprises:
   upon the web server side detects that there is no screenshot picture information corresponding to the device identifier in the screenshot picture information set, sending, by the web server side, a playing re-monitoring instruction to the corresponding screen device side through the device connection channel corresponding to the device identifier; and
   after the screen device side receives the playing re-monitoring instruction, continuing to capture, by the screen device side, screen pictures at a preset frequency to obtain screenshot picture information, and sending the screenshot picture information to the web server side through the device connection channel; sending, by the web server side, the screenshot picture information to the web client side through the client side connection channel; and performing, by the web client side, displaying according to the screenshot picture information.

13. The method according to claim 10, wherein after the web server side sends the playing monitoring start instruction to the screen device side corresponding to the device identifier of the monitored device, the method further comprises:
   upon the web client side receives a second playing monitoring stop instruction, sending, by the web client side, the second playing monitoring stop instruction to the web server side through the client side connection channel, and deleting, by the web server side, the client side connection channel identifier corresponding to the web client side which sends the second playing monitoring stop instruction, from the second monitoring table, wherein the second playing monitoring stop instruction comprises a device identifier of the monitored device;
   acquiring, by the web server side, a corresponding device connection channel identifier from the first monitoring table according to the device identifier of the monitored device, and determining whether there is still a client side connection channel identifier corresponding to the device identifier of the monitored device in the second monitoring table;

when the web server side determines that there is no client side connection channel identifier corresponding to the device identifier of the monitored device in the second monitoring table, sending, by the web server side, a second playing monitoring stop instruction to the corresponding screen device side through the device connection channel corresponding to the device identifier of the monitored device, and deleting all screenshot picture information corresponding to the device identifier of the monitored device from the web server side; and upon the screen device side receives the second playing monitoring stop instruction, stopping, by the screen device side, capturing screen pictures; and when the web server side determines that there is still a client side connection channel identifier corresponding to the device identifier of the monitored device in the second monitoring table, sending, by the web server side, a second pushing stop instruction to the corresponding screen device side through the device connection channel corresponding to the device identifier of the monitored device, and deleting all screenshot picture information corresponding to the device identifier of the monitored device; upon the web server side receives the second pushing stop instruction, stopping, by the web server side, sending to the web server side the screenshot picture corresponding to the web client side which sends the second playing monitoring stop instruction.

14. The method according to claim 1, wherein after the screen device side captures the screen pictures at the preset frequency to obtain the screenshot picture information, the method further includes: the screen device side calls a compression algorithm to compress the screenshot picture information to obtain compressed screenshot picture information;

sending, by the screen device side, the screenshot picture information to the web server side includes: sending, by the screen device side, the compressed screenshot picture information to the web server side through the device connection channel.

15. The method according to claim 1, wherein the preset frequency is 10 to 26 frames per second.

16. The method according to claim 1, wherein a device identifier of each monitored device corresponds to one or more client side connection channel identifiers in the second monitoring table.

17. The method according to claim 1, wherein the client side connection channel and the device connection channel are websocket connection channels.

18. A system for monitoring playing on a screen device, applied to a system comprising a web server side, at least one screen device side, and at least one web client side corresponding to the web server side; wherein the web client side is configured to acquire a device identifier of a monitored device, generate a playing monitoring start instruction according to the device identifier of the monitored device, and send the playing monitoring start instruction to the web server side; the web client side is further configured to perform displaying according to screenshot picture information;

the web server side is configured to receive the playing monitoring start instruction, acquire the device identifier of the monitored device from the playing monitoring start instruction, and send the playing monitoring start instruction to a screen device side corresponding to the device identifier of the monitored device; the web server side is further configured to send the screenshot picture information to the web client side; and the screen device side is configured to capture screen pictures at a preset frequency according to the playing monitoring start instruction, to obtain screenshot picture information, and send the screenshot picture information to the web server side, wherein before the web client side acquires the device identifier of the monitored device, the screen device side is further configured to establish a device connection channel with the web server side, generate a device connection channel identifier, and send a device identifier of the screen device side to the web server side through the device connection channel;

the web server side is further configured to update a first monitoring table according to the device identifier and the device connection channel identifier, wherein a corresponding relationship between the device identifier and the device connection channel identifier is recorded in the first monitoring table;

the web client side is further configured to receive a device monitoring instruction, establish a client side connection channel with the web server side and generate a client side connection channel identifier, wherein the device monitoring instruction comprises the device identifier of the monitored device; and the web client side is further configured to acquire the device identifier of the monitored device from the device monitoring instruction;

after the web server side receives the playing monitoring start instruction, the web server side is further configured to acquire the device identifier of the monitored device from the playing monitoring start instruction, and update a second monitoring table according to the device identifier of the monitored device and the client side connection channel identifier, wherein a corresponding relationship between the device identifier of the monitored device and the client side connection channel identifier is recorded in the second monitoring table; and the web server side is further configured to communicate with the web client side through the client side connection channel, and communicate with the screen device side through the device connection channel.

19. A non-transitory computer-readable storage medium, configured to store computer program instructions, wherein when the computer program instructions are run, the method for monitoring playing on a screen device according to claim 1 is implemented.

* * * * *